United States Patent [19]

Shippey et al.

[11] 3,992,301
[45] Nov. 16, 1976

[54] AUTOMATIC FLUSHING SYSTEM FOR MEMBRANE SEPARATION MACHINES SUCH AS REVERSE OSMOSIS MACHINES

[75] Inventors: Frank R. Shippey, Thousand Oaks; Timothy C. Vance, Los Angeles; Fred E. Martin, Newbury Park, all of Calif.

[73] Assignee: Raypak, Inc., Westlake Village, Calif.

[22] Filed: Mar. 5, 1975

[21] Appl. No.: 555,640

Related U.S. Application Data

[63] Continuation of Ser. No. 417,286, Nov. 19, 1973, abandoned.

[52] U.S. Cl. .......................... 210/23 H; 210/96 M; 210/140; 210/433 M
[51] Int. Cl.² ................... B01D 31/00; B01D 13/00
[58] Field of Search ............. 210/321, 409, 23, 433, 210/140, 96 M

[56] References Cited
UNITED STATES PATENTS

| | | |
|---|---|---|
| 3,280,978 | 10/1966 | Scott .............................. 210/81 X |
| 3,355,382 | 11/1967 | Huntington ..................... 210/321 X |
| 3,782,556 | 1/1974 | Murkes .............................. 210/409 |
| 3,794,169 | 2/1974 | Sisk et al. ....................... 210/321 X |
| 3,827,976 | 8/1974 | Stana et al. .......................... 210/23 |
| 3,846,295 | 11/1974 | Gibbs .............................. 210/321 X |

Primary Examiner—Frank A. Spear, Jr.
Attorney, Agent, or Firm—Herzig & Walsh, Inc.

[57] ABSTRACT

An automatic flushing and cleaning system for membrane separation machines such as reverse osmosis machines having plural modules or membranes. Cleaning may be by way of reducing the pressure to allow the membrane to relax, by the injection of air or inert gas to provide turbulence, and/or by injection of flushing liquid which may include chemical cleaning additives. Pumps, automatic valving, and pressure controls are provided, along with a complete timer operated electrical sequencing system whereby desired purging, flushing and cleaning cycles are automatically undertaken at periodic intervals or in response to one or more preferred conditions.

13 Claims, 11 Drawing Figures

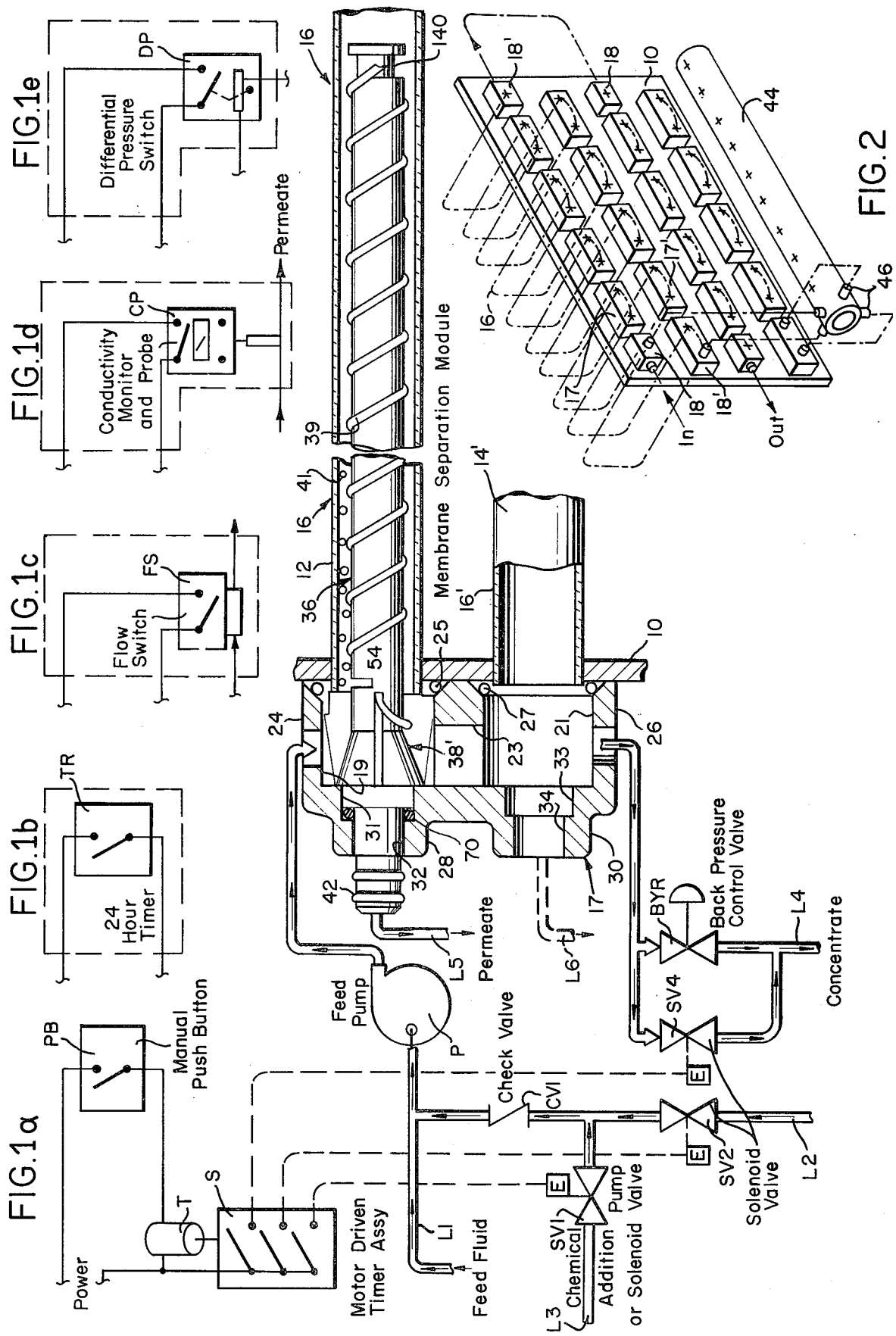

AUTOMATIC FLUSHING SYSTEM FOR MEMBRANE SEPARATION MACHINES SUCH AS REVERSE OSMOSIS MACHINES

This application is a continuation of Ser. No. 417,286 filed Nov. 19, 1973, now abandoned.

SUMMARY OF THE INVENTION

The invention is an automatic cleaning or flushing system which in the exemplary embodiment is for use in reverse osmosis machines. Typically, reverse osmosis machines embody core members having a surface carrying a semipermeable membrane through which the reverse osmosis takes place for purposes of separating components from liquid. The herein invention provides a system of pumps, valving, and automatic controls to provide for automatic flushing and cleaning of all of the membranes by way of process functions as described in detail hereinater, includng relaxing of the membrane by reduction of pressure, injection of air or inert gas into the feed liquid, pumping flushing water or other liquid through the machine for purging, and/or feeding in chemical additive liquid. In the preferred exemplary form of the invention as described in detail herein, a complete automatic electrical sequencing system is provided whereby the cleaning operations or sequence is undertaken at periodic intervals in response, for example, to a time-operated switch, or other conditions which automatically indicate the need for cleaning and/or purging.

The invention may be adapted to all membrane separation systems such as electrodialysis, piezodialysis, pressure dialysis, and biomembranes.

Probably the greatest difficulty encountered in the operation of reverse osmosis machines is that of preserving membrane usefullness. In most reverse osmosis applications, after a period of operation, the membrane starts to loose its capacity. A typical installation may start off with a membrane flux density of 20 gallons/sq ft/day and, in time, the membrane could deteriorate to 8 or even 6 gallons/sq ft/day. To minimize this condition of membrane decay, a system of automatically treating the membrane at periodic intervals has been originated.

In normal operation, particulate matter in the feed water has a tendency to settle out on the surface of the membrane, and certain particles not only settle on the membrane, but fuse together to make a continuous film over the surface of the membrane. The clogging of the membrane can also be caused by concentrated salts that precipitate out of the feed solution and settle on the surface of the membrane. Even if a reduction in membrane flux could be tolerated, deposits of foreign matter on the surface of the membrane are undesirable because they tend to allow bacterial growth that will in time attack and destroy the membrane. Membrane separation systems suffer from the coating forming over the surface which is called fouling. It can be formed by precipitation of inorganic salts, settling out of flocs of saturated organic or inorganic material or coating out of inorganic materials. These are caused primarily through factors which decrease the turbulence at the interface of the process fluid with the membrane surface leading to deposits within the boundary layer. These deposits cause a reduction in solvent, i.e., water permeation through the membrane, thus providing a significant change in the quality and quantity of both the final concentrate and the permeate.

To minimize the condition described, high Reynolds numbers have been used, and the herein invention uses a plastic spring turbulator to further increase the Reynolds number adjacent to the surface of the membrane.

It is conventional in the art to inject detergents, chemical removing agents, and enzymes in an attempt to remove the foreign matter that has collected on the surface of the membrane. These methods are not completely successful. One other method is to shut the machine down and allow the normal osmotic flow through the membrane to dislodge the foreign matter on the surface of the membrane. Normal osmotic flow takes place between the permeate (that has already passed through the membrane) backwards through the membrane to the feed side of the membrane. The amount of benefit obtained from this method is argumentative at best.

The herein invention provides the reverse osmosis machine with an automatic timing device, supplemental valves, and piping to automatically treat the membrane at periodic intervals. A significant improvement obtained by this supplemental system involves the injection of air or another noncondensable gas, into the feed water. The air entrained in the feed water creates a tremendous turbulation and very effectively dislodges the foreign matter on the surface of the membrane. This air injection method works especially well when used in conjunction with the plastic spring turbulator, which is disclosed in U.S. Pat. No. 3,768,660 issued Oct. 30, 1973, owned by the common assignee and which is hereby incorporated herein by reference.

In addition to injecting air, this system permits injection of flushing solutions at periodic intervals. Air may or may not be used in conjunction with the flushing solution. Also, this system provides for relaxing of the membrane by reducing the pressure on the feed side (or both sides). As the membrane is not a rigid structure, the reduction in pressure allows the membrane to flex and dislodge foreign matter from the surface of the membrane. The membrane relaxing technique may be combined with the injection of a flushing solution, wih air injection, or with both injecting of a flushing solution and with air injection.

The herein invention provides a fully automated improved cleaning system which will realize the cleaning objects by accomplishing the following:

1. Decreasing operating pressure (surging) to allow membrane relaxation, and in some cases, osmotic backflush without affecting the process fluid quality. When a positive displacement pump is used in conjunction with an accumulator (on the discharge side of the pump), a decrease in operating pressure will result in a momentary increase in flow velocity due to the action of the accumulator. This momentary velocity increase is referred to as surging and has a beneficial effect as far as removing foreign matter from the surface of the membrane.

2. Automatically injecting flush solutions, when required, the flush cycle being timed to allow minimal loss of process fluid.

3. Injecting gas during low pressure surge. Tests have shown that this gas injection during the low pressure phase of operation effects much superior membrane cleaning than the procedures which are normally used, and will not affect the process fluid quality. The realization of this improved cleaning is a specific object.

4. Combination of all of the above can be undertaken by the system, optionally as desired, and in a fully automated sequence.

The herein system includes a series or system of fully automatic controls which allow sequencing of all or part of the auto flush pressure surge process as described. This control sequencing system is adjustable to accommodate all phases of the operation automatically without an operator, and may be altered to accommodate variations in quality of the feed solution. It will sequence the various phases so they can be accomplished individually or sequentially, via cascaded control circuitry.

All components to realize this auto flush pressure surge cleaning are integrated into the system of the invention, minimizing user's labor, both on installation and operation, and thus reducing his costs and promoting economy, these ends being among the objects realized by the invention.

BRIEF DESCRIPTION OF THE DRAWINGS

Further objects and additional advantages of the invention will become apparent from the following detailed description and annexed drawings, wherein:

FIG. 1A is a diagrammatic view of a simplified, exemplary form of the flushing system. This figure shows diagrammatically one module and header of a reverse osmosis machine;

FIGS. 1B, 1C, 1D, and 1E are partial views illustrating different types of automatic control instruments which can be used to initiate the flushing cycle;

FIG. 2 is a diagrammatic isometric view illustrating a portion of a complete reverse osmosis machine to illustrate flows, feed into the modules, flows of concentrates out, and flows of permeate out;

FIGS. 3A, 3B, and 3C are partial views similar to FIGS. 1B through 1E, illustrating different control instruments.

DESCRIPTION OF THE PREFERRED EMBODIMENTS

Figure 3:
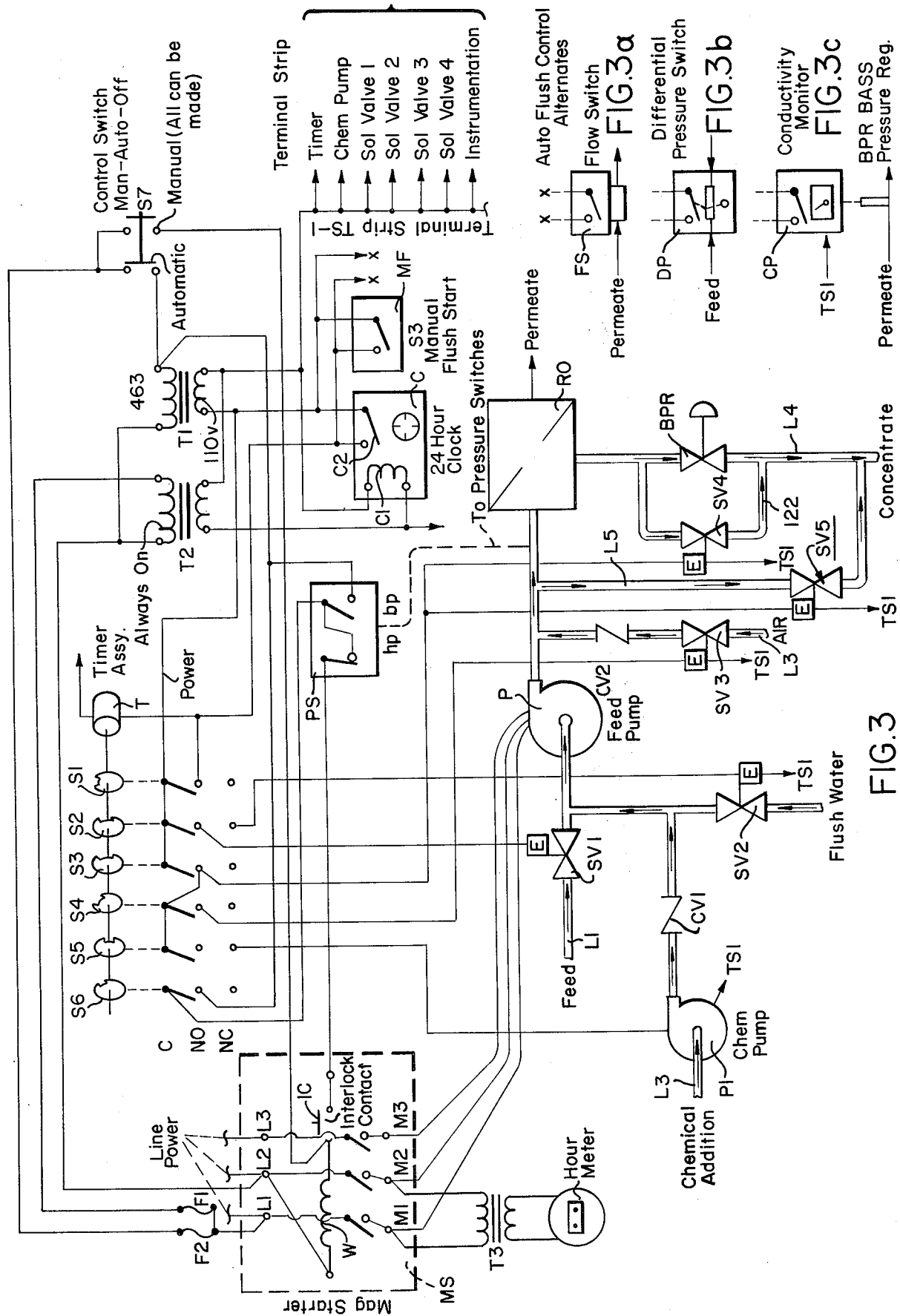
FIG. 3 is a diagrammatic or schematic view of the automatic flushing system illustrating complete automatic control circuitry and instrumentalities for effecting the automatic flushing cycle.

FIG. 1 shows a reverse osmosis machine arrangement. The small circles on FIG. 1 represent entrained air. As this air is constantly expanding, it is readily evident that a high velocity of air and feed water scrub the surface of the membrane. The construction shown is that of application Ser. No. 225,945 filed Feb. 14, 1972, now U.S. Pat. No. 3,786,925, owned by the common assignee and which is hereby incorporated herein by reference.

FIG. 1 shows a sectional view of a part of the reverse osmosis machine as illustrated schematically in FIG. 2, showing a part of tube sheet 10 and a header 17. Tube sheet 10 has secured in it the ends of tubes 12 and 14 which are sections of similar U-tubes 16. Numeral 17 designates a metal header casting which connects tube sections 12 and 14. Header 17 has mounting lugs which can be attached to tube sheet 10 by suitable means. It has two integral, cylindrical parts 24 and 26 which have extending bosses or nipples 28 and 30 having bores 32 and 34 and counterbores 31 and 33 as may be seen. These bores receive cylindrical parts of plastic fittings forming part of the desalination cells. Within parts 24 and 26 are bores 19 and 21 connected by passageway or port 23. Bores 19 and 21 ae bevelled at their ends as shown and sealed to tube sheet 10 by O-rings 25 and 27.

The headers like 17 connect U-tubes like 16 in successive tiers at different levels as may be seen in FIG. 2 and as described in detail in the application referred to.

Numeral 18 designates an inlet header casing and 18' designates a similar casting which is an outlet header. Inlet header 18 is shown in detail in the prior application.

Within tube 12 of U section 16 is shown a cylindrical desalination cell 36 having a plastic end fitting 38 which is described in detail in said U.S. Pat. No. 3,768,660. Numeral 39 designates a plastic helical spring, the convolutions of which under the influence of pressure, can move axially to clean the membrane in conjunction with the air bubble turbulence 41.

As explained and shown in FIG. 2, there are a plurality of U-tubes 16 connected to headers 17 mounted from tube sheet 10 with a reverse osmosis cell in each tube section with a continuous series flow of feed fluid through the tubes as illustrated in FIGS. 1 and 2.

End parts 42 of fittings 38 which extend from the headers connect to permeate manifold 44 as may be seen in FIG. 2. Manifold 44 has four series of equally angularly spaced nipples 46, these series of nipples being connected to the ends parts or nipples 42 of the reverse osmosis cells. The purified fluid is drawn off through this manifold. The feed of fluid to be purified or desalinized, in the case of desalination cells, connects to inlet header 18 as designated by the arrow. The concentrate is taken off at outlet header 18' as indicated.

FIG. 1A shows feed pump P which pumps into header 17 as shown from feed line L1. The flushing liquid line is designated L2 having in it solenoid valve SV2 and check valve CV1 connected to line L1. The chemical additive line is designated L3, having in it solenoid valve SV1.

FIG. 1A shows the reverse osmosis system equipped with a solenoid valve SV4 which bypasses the back pressure regulator valve BPR. Solenoid valve SV4, when opened, drops the pressure in the membrane module and allows the membrane to relax. Normally, back pressure regulator BPR maintains the pressure in the unit. When the solenoid valve opens, by passing the flow around the back pressure regulator, the surface of the membrane is exposed to a sudden increase in velocity and also a sudden decrease in pressure. These are the factors that tend to dislodge the foreign particles on the surface of the membrane. Solenoid valve SV2 is used to inject a flushing solution into the feed water. A valve SV3 may be provided to allow compessed air to enter the feed water stream as in FIG. 3. Depending upon the type of membrane used, the feed solution, and other operating conditions of the system, it may be desirable to preserve membrane usefulness by only membrane relaxation at any predetermined period, by the injection of air or a specific type of noncondensable gas at predetermined intervals, or a combination of any two or three of the above methods as referred to more in detail hereinafter.

The herein process has been tested on various solutions with a high degree of success. The flushing or cleaning cycle may be triggered by a reduction in permeate flow, an increase in concentration or the permeate, and an increase in feed pressure and similar factors.

FIG. 1A shows a simplified control circuit for the flushing system. The letter T designates a timer motor which can be energized by manual push button switch PB. It drives switch mechanism S having three contact terminals and three blades which control the solenoid valves SV1, SV2, and SV4. The solenoids in each case are designated by the letter E. Back pressure regulator BPR controls the pressure in the reverse osmosis unit, that is, on the concentrate side which effectively controls the pressure on the inlet side. The operating pressure might be in a range from 300 psi to 1500 psi. Solenoid valve SV4 bypasses back pressure control valve BPR when the solenoid valve is opened. Pressure in the reverse osmosis machine is dropped, allowing the membrane to relax.

FIGS. 1B, 1C, 1D, 1E, and 1F illustrate optional alternatives or instrumentalities which may be used individually or collectively along with or without manual switch PB. FIG. 1B illustrates a 24-hour time switch TR. FIG. 1C illustrates a flow switch FS response to flow of permeate. It would start a flushing cycle in response to reduction of flow of permeate. FIG. 1D illustrates a conductivity probe CP which would operate in response to conductivity of the permeate illutrative of the degree of purity. FIG. 1E illustrates a differential pressure switch DP which would operate in response to pressure conditions indicative of fouling or clogging in the reverse osmosis machine.

OPERATION

From the foregoing, those skilled in the art will readily understand the operation of the systems illustrated by FIGS. 1A, 1B, 1C, 1D, and 1E. Normally, feed is pumped by pump P through line L1 to the reverse osmosis machine, and the concentrate is taken off through line L4 and the permeate, through lines L5 and L6 as described. If there is need for a flushing or cleaning cycle, it may be initiated manually or in response to any of the instrumentalities as illustrated in FIGS. 1B, 1C, 1D, and 1E. The flushing cycle is initiated by closure of any one or more of the contacts of the manual push button PB or the switches of FIGS. 1B-1E. Opening of solenoid valve SV4 bypasses back pressure regulator BPR, dropping the pressure and relaxing the pressure on the membrane to effect the cleaning function in this manner, as described in the foregoing. Opening of solenoid SV2 allows flushing liquid to be pumped through the machine for purging by pump P, line L1 being closed off at this time by a solenoid valve (not shown). This flows through check valve CV1. Opening of solenoid valve SV1 allows suitable chemical additive which may be of a soap type to be drawn into the inlet line to the pump and circulated through the reverse osmosis machine.

FIG. 3 is a diagrammatic view of an exemplary system similar to that of FIG. 1A with a preferred exemplary form of control system more fully illustrated.

In FIG. 3, the reverse osmosis machine is illustrated at RO. The feed line is designated at L1 to feed pump P. The feed line to the pump has in it solenoid valve SV1. Numeral L2 designates the line for flush liquid and L3 the line for chemical additive which connects to line L2. Check valve CV1 is in the discharge line from additive pump P1. In flush water line L2 is solenoid valve SV2.

The air admission line is designated at L3 having in it check valve CV2 and solenoid valve SV3.

The concentrate line from the RO unit is designated at L4 having in it back pressure regulator BPR. There is a bypass line around this unit having in it solenoid valve SV4.

FIG. 3 shows the injection of air between the pump and the RO cell. Under certain conditions, it is desirable to inject the air or other noncondensable gases at the inlet of the pump instead of at the outlet of the pump. It is possible also to construct a system that has no pump and the feed pressure is supplied by the city water pressure. On a system of this type, the air is injected anywhere along the feed piping.

In installations with relatively low air pressure, an alternative piping arrangement to permit air injection by substantially lowering the manifold pressure consists basically of a bypass about the entire RO cell system and back pressure regulating valve. Shown in FIG. 3 is a additional solenoid valve SV5. Valve SV5 serves as a liquid bypass between the feed and concentrate system of the membrane module. Electrically, valve SV5 is in paarallel with BPR bypass valve SV4. In the bypass mode, SV5 allows a portion of the feed stream to be bypassed around the membrane module, reducing the flow rate through the membrane module.

Reduced liquid flow rate allows for a further reduction in the differential pressure across the membrane module caused by hydraulic head losses. The reduced feed pressure (bypass mode) allows for the injection of gas at pressures less than normal shop air.

The control circuitry for the system including the automatic sequencing mechanism will next be described. The letter E adjacent to the solenoid valves designates the electrical solenoid associated with each valve.

The power line terminals ae designated L1, L2, and L3. These terminals ae on a magnetic starter MS having a winding interlock contact IC and terminals M1, M2, and M3. Letters F1 and F2 designate fuses. Numeral T designates an automatic timer assembly driving cam operated single pole, double throw switches operated by the cams designated S1, S2, S3, S4, S5, and S6. The switches have common terminals and normally opened and normally closed contacts as designated.

Numerals T1 and T2 designate step-down transformers, each having a primary winding and a secondary winding. Character S7 designates a manual control switch having two pairs of bridgable contacts, one pair for manual start and one for automatic control as will be described.

Numeral T3 designates a further step-down transformer having a primary winding and a secondary winding, the primary winding being connected to terminals M1 and M2 of magnetic starter MS and having its secondary winding connected to hour meter HM. The letters PS designate a pressure switch having high pressure and low pressure contacts as indicated, which may operate at 1500 and 300 psi in the exemplary embodiment.

The letter C designates an electric clock switch having a winding C1 and automatic time-operated switch contacts C2. Letters MF designate a manual switch for manually starting the flushing sequence. The leads to this switch may be bridged by way of leads XX which may connect to alternate optional types of controls as shown in FIGS. 3A, 3B, and 3C as previously described.

Referring to the electrical circuitry, it will be observed that terminals M1, M2, and M3 connect to the motor driving feed pump P. The power is carried from the terminals L1 and L2 to the primary of transformers T1 and to the primary of T2 by way of manual switch S7.

The secondary of transformer T1 supplies power under control of the cam switches, the pressure switches, and clock switch C2 for the solenoid valves. The secondary of transformer T2 supplies power for winding C1 of clock C.

Cam switch S1, through its NO contact, controls the motor of the timer assembly T. Cam switch S2 controls solenoid valve SV1 through its NO contact and solenoid valve SV2 through its NC contact. Cam switch S3 controls solenoid valves SV4 and SV5; cam switch S4 controls solenoid valve SV3; and cam switch S5 controls chemical additive pump P1. Pressure switch PS normally controls power through winding W of the magnetic starter MS. The low pressure contacts of pressure switch PS can be shunted by the NO contact of cam switch S6 as will be described.

Character TS1 designates a terminal strip to which there is a return lead as indicated from each electrical component.

Normal Operation of the Reverse Osmosis Machine — FIG. 3

FIG. 3 shows in detail an exemplary form of automatic control system. The following describes the normal operation of the reverse osmosis machine, after which the automatic sequencing operation of the flushing system will be described.

In the normal operation, switch S7 is closed, that is, both of its contacts are closed. This is a manual switch, which when manually operated, first closes the automatic contacts and then closes the manual contacts which remain closed. Closure of the S7 contacts energizes the magnetic starter MS. Upon energization, it closes its contacts in the three wire power line and also closes the interlock contact IC, the purpose of which will be described presently.

Power is now supplied to transformers T1 and T2. Actually, power is always on the transformer T2. The secondary supplies power to the motor winding of the clock switching mechanism C. This clock mechanism operates continuously even when the machine is shut down.

Pressure switch PS operates between the exemplary pressure figures of 1,500 psi for the high pressure contact and 300 psi for the low pressure contact. At time of starting, the low pressure contact is open because the pressure has not had an opportunity to build up. At this time, the operator sets the back pressure regulator BPR to the pressure he wishes to maintain in the reverse osmosis unit. Accordingly, the pressure begins to rise until the low pressure switch LP closes. When it closes, it produces an additional circuit through interlock contact IC of the magnetic starter which shunts the manual contact switch S7. The machine will now remain in operation even though these contacts may be opened, and the manual contacts of switch S7 will now be opened. Should pressure in the unit now rise high enough to open the HP contacts of pressure switch PS, this would shut down the machine by de-energizing the magnetic starter MS. It will be observed that if the high pressure switch opens and shuts down the machine, causing the magnetic starter to release, it will open the interlock contact IC. The machine cannot now be restarted unless the manual contacts of switch S7 are again closed.

Flushing Sequence Operation — FIG. 3

The flushing sequence may be started by the 24-hour clock C or by the manual start switch MF or optionally, by any one of the switches illustrated in FIGS. 3A, 3B, or 3C which are or may be in parallel with manual switch MF and the 24-hour clock switch. The flow switch, FIG. 3A, would close in response to a condition indicating the need for cleaning which would be a reduction in flow of permeate. The differential pressure switch, FIG. 3B would indicate a need for cleaning which would be a particular pressure differential. The conductivity monitor switch, FIG. 3C, would close in response to a monitored condition, indicating reduction of quality of the permeate indicative of a need for cleaning.

Closure of the 24-hour clock switch energizes the timer T. Cam switch S1 closes its normally open contact establishing a circuit, keeping the timer in operation. Power is supplied by the secondary of transformer T1.

In the exemplary embodiment, the sequence is as follows:
 1. Start cycle.
 2. Bypass (or shunt) pressure switch.
 3. Switch feed.
 4. Dump concentrate and start the additive flowing.
 5. Shut off additive.
 6. Switch feed.
 7. Close concentrate bypass.
 8. Enable pressure switch.

Figure 4:
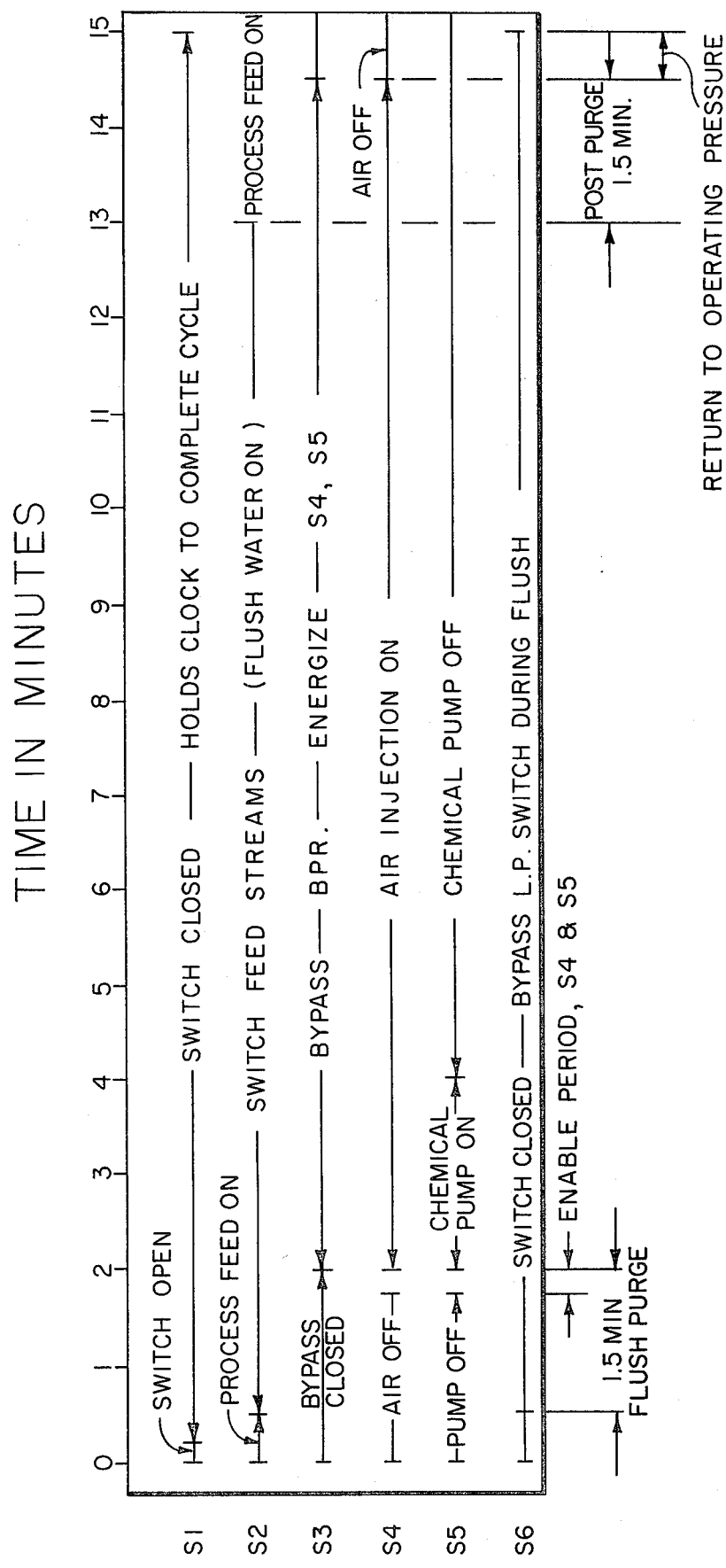
FIG. 4 is a chart illustrating an exemplary flushing sequence as effected by the timer operated cam switches and control circuitry of FIG. 3.

FIG. 4 is a chart of an exemplary flushing cycle illustrating cam switch initiated functions and exemplary times for each phase of the cycle.

Operation of switch S1 to close its NO contact is a first step in the sequence; cam switch S6 closes to a normally open contact which bypasses the LP contact of the pressure switch. This is necessary to keep the machine operating, since the LP contact is closed at this time, but it will open further on in the sequence as will be described and has to be bypassed or shunted at this time.

The next step in the sequence is that cam switch S2 will open a normally closed contact and close a normally open contact which causes valve SV1 to close and solenoid valve SV2 to open. The operation cuts off feed to pump P and admits flush water to the pump. A period of time will be required for the flush water to circulate through the reverse osmosis machine and to flush out impurities, this being a purging period which in the exemplary form of the invention might be a minute and a half to three minutes as illustrated. There is now a buffer zone of clear flush water between the pump inlet and concentrate line. Now, the chemical additive pump will be turned on as follows. Cam switches S4 and S5 will now close to a normally open contact completing enabling circuits to be energized hereafter to chemical pump P1, to valve SV which is in the air injection line. Cam switch S3 at this time has its contact open and shortly after the actuation of cam switches S4 and S5 closes its normally open contact providing power from the positive side of the secondary of transformer T1 to cam switches S4 and S5; and it now energizes the chemical pump P1 and the solenoid valve SV3. Closure of the normally open contact of cam switch S3 also provides power to the solenoid valves SV4 and SV5 which bypass the back pressure regulator BPR with the result that it closes. Cam switch S3 provides a power interlock which makes it possible for cams S4 and S5 to operate separate switches, whereby it is possible to open the circuits of these switches as different times, as will be described more in detail presently.

In the exemplary embodiment, the chemical additive pump is kept on for about two minutes although this period is variable from about 1–12½ minutes. In the exemplary embodiment, after two minutes, cam switch S5 de-energizes the chemical additive pump. This discontinues the supply of chemical additive (soap) to the reverse osmosis unit. The actual cleaning solution which is used depends on the application to which the system is being put, that is, the type of liquid that is being cleaned by reverse osmosis. Thus, the cleaning solution might be ordinary bleach, sodium hypoclorite, or iodine. In the exemplary embodiment, now for a period which may be period for 9 minutes, the flush water is being pumped through the system, purging the cleaning solution and the water mixture. The air injection remains on while purging. At the end of the 9 minute period, the air injection valve SV3 is shut off, and the feed streams are switched, cutting off the flush water, closing SV2 and re-opening feed valve SV1 as follows. Cam switch S4 now opens its normally closed contact to close SV3 and to cut off the air. Cam switch S2 opens a contact, de-energizing solenoid SV2 and cutting of the flush water and closes a contact re-energizing solenoid valve SV1 establishing normal feed to feed pump P. At this time, solenoid valve SV4 is still open. Thus, there is no pressure in the reverse osmosis unit. The feed stream is now allowed to feed for a minute and a half in the exemplary embodiment to flush the purge water out of the system. At the end of this period, cam switch S3 operates to de-energize SV4, causing it to close, allowing pressure to build up in the system and causing back pressure regulator BPR to come back into operation. Cam switch S3 also opens its contact which had been closed, interrupting the power circuit to cam switches S4 and S5, although these contacts had already opened. At this time, the circuit shunting or bypassing the LP contact of the pressure switch PS is still closed and in the exemplary embodiment, it will remain closed for about 30 seconds, at which time, cam switch S6 operates to open a contact, interrupting this shunt or bypass circuit which has been kept closed up to this time to permit the system to return to normal operation.

From the foregoing, those skilled in the art will readily understand the invention and the manner in which all objects are achieved.

The foregoing disclosure is representative of preferred forms and adaptations of the invention and is to be interpreted in an illustrative rather than a limiting sense, the invention to be accorded the full scope of the claims appended hereto.

What is claimed is:

1. In an apparatus of a type providing at least one module comprising a core member having a semipermeable membrane on the surface thereof, in a position to be exposed to a feed liquid in a manner whereby the liquid can permeate through the membrane producing flows of permeate and concentrate, means for directing a feed liquid from a source thereof to said membrane under pressure, a source of flush liquid separate from said feed liquid and a source of air for cleaning purposes, control means for causing interruption of circulation of feed liquid through the apparatus and for initiating a cleaning cycle, the control means including means for releasing the pressure in the module and for causing flow therethrough of said flush liquid for cleaning, the control means haing means to initiate the flow of flushing liquid and for injection of air from said source under pressure in the flushing liquid for a timed interval whereby the air expands in the liquid creating turbulence, serving to clean the surface of the membrane.

2. An apparatus as in claim 1 including a source of chemical additive, the control means including means to initiate a flow of chemical additive with the flushing liquid and the air.

3. Apparatus as in claim 2, including means for terminating the flow of chemical additive while continuing the flow of the flushing liquid for purging prior to restarting the flow of feed liquid.

4. An apparatus as in claim 1 wherein the control means includes electrical valves for controlling flows of feed liquid, flushing liquid and air, the control means including electrical sequencing means for operating the valves to discontinue feed liquid flow, to open a discharge line from the module and to initiate the flows of flush liquid and air.

5. An apparatus as in claim 4, wherein said sequencing means includes electrical contacts for shunting the relatively low pressure contacts, whereby to maintain operation of the system, when the pressure in the module has been dropped for cleaning purposes.

6. An apparatus as in claim 1, including pressure responsive electrical means responsive to pressure in the module, said means including switch contacts responsive to pre-determined relatively high and relatively low pressures and means to bypass the relatively low pressure contacts during start up of normal operation of the system after cleaning.

7. An apparatus as in claim 1, including a back pressure regulating valve in the outlet line of the module, valve means connected in bypassing relationship with said back pressure regulating valve and means for opening said valve in bypassing relationship for reducing the pressure in the module.

8. An apparatus as in claim 1, wherein said means for circulating the feed liquid through the apparatus includes a pump, said source of flush liquid being connected whereby the pump can pump the flush liquid through the module.

9. An apparatus as in claim 1, including condition responsive means responsive to a condition indicative of a need for cleaning of the module for initiating the cleaning cycle.

10. An apparatus as in claim 1, including a branch conduit connected between the inlet to the module and a discharge line through a controllable valve.

11. A method of cleaning an apparatus of the type having a module which includes a core member having a semipermeable membrane on the surface thereof and means to direct feed liquid under pressure to said membrane whereby the liquid can permeate through the membrane producing flows of permeate and concentrate, the steps of stopping the flow of feed liquid through the module, releasing the pressure in said module initiating a flow of flushing liquid other than said feed liquid through the module, and injecting gas under pressure into the flushing liquid whereby the gas expands in the liquid creating turbulence serving to clean the surface of the membrane in the module.

12. A method as in claim 11, including the step of injecting chemical additive into the flushing liquid going into the module.

13. A method as in claim 12, including the step of discontinuing the flow of chemical additive while continuing the flow of flushing liquid for purging purposes.

* * * * *